United States Patent
Okamoto

(10) Patent No.: US 10,404,914 B2
(45) Date of Patent: Sep. 3, 2019

(54) IMAGE CAPTURING DEVICE WITH A MODE SWITCH TO SET IMAGE-CAPTURING MODES

(71) Applicant: Teppei Okamoto, Tokyo (JP)

(72) Inventor: Teppei Okamoto, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 7 days.

(21) Appl. No.: 15/783,426

(22) Filed: Oct. 13, 2017

(65) Prior Publication Data

US 2018/0115722 A1  Apr. 26, 2018

(30) Foreign Application Priority Data

Oct. 21, 2016  (JP) ................. 2016-207048

(51) Int. Cl.
*H04N 5/232* (2006.01)
*G02B 26/08* (2006.01)

(52) U.S. Cl.
CPC ......... *H04N 5/23245* (2013.01); *G02B 26/08* (2013.01); *H04N 5/232* (2013.01);
(Continued)

(58) Field of Classification Search
CPC ........... H04N 5/23296; H04N 5/23245; H04N 5/232; H04N 5/23216; H04N 5/23241; H04N 5/23293; H04N 2101/00; G02B 26/08; G02B 23/14; G02B 23/145; G02B 13/02; G03B 19/12
(Continued)

(56) References Cited

U.S. PATENT DOCUMENTS

2003/0169352 A1*  9/2003  Kitani ............... H04N 5/23245
                                                    348/247
2010/0039402 A1*  2/2010  Okazaki .............. G06F 1/3231
                                                    345/173
(Continued)

FOREIGN PATENT DOCUMENTS

JP    2011-049750    3/2011

OTHER PUBLICATIONS

The Viewfinder Selector, Jul. 30, 2016, http://fujifilm-dsc.com/en/manual/x100t/parts/selector_finder/index.htnnl, retrieved Apr. 19, 2019. (Year: 2016).*

*Primary Examiner* — Albert H Cutler
(74) *Attorney, Agent, or Firm* — Oblon, McClelland, Maier & Neustadt, L.L.P.

(57) ABSTRACT

An image capturing device including a mode switch rotatable to change a pointing position movable between three predetermined positions corresponding to at least three image-capturing modes including a first mode, a second mode, and a third mode, to switch between the first mode, the second mode, and the third mode. The image capturing device further includes a power switch and circuitry. The power switch receives a user input for turning on or off the power of the image capturing devices. The circuitry controls the image capturing device to operate in one of the three image-capturing modes. When the power switch receives a user input for turning on the power, the circuitry controls the image capturing device to operate in one of the three image-capturing modes corresponding to the pointing position of the mode switch that has been set when the power switch is turned off.

8 Claims, 18 Drawing Sheets

(52) U.S. Cl.
CPC ..... *H04N 5/23216* (2013.01); *H04N 5/23241* (2013.01); *H04N 5/23296* (2013.01)

(58) Field of Classification Search
USPC ............ 348/333.01, 333.09, 333.08, 333.13; 396/141, 148, 296, 373, 374
See application file for complete search history.

(56) References Cited

U.S. PATENT DOCUMENTS

2011/0050932 A1\* 3/2011 Kumagai ............. H04N 5/2254
                                                          348/220.1
2014/0333819 A1    11/2014 Aoki
2018/0262733 A1\*  9/2018 Aoki ....................... G03B 13/02

\* cited by examiner

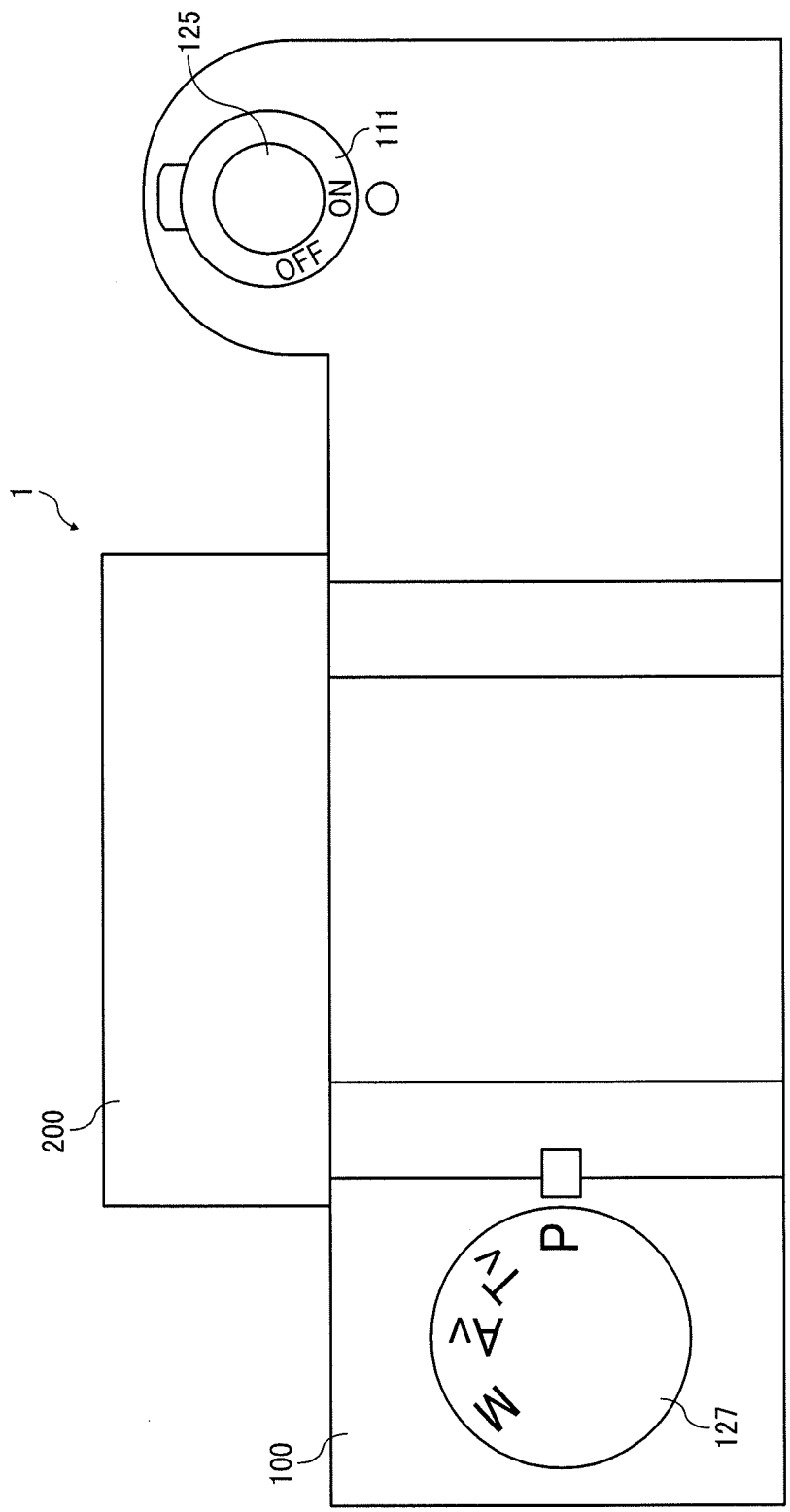

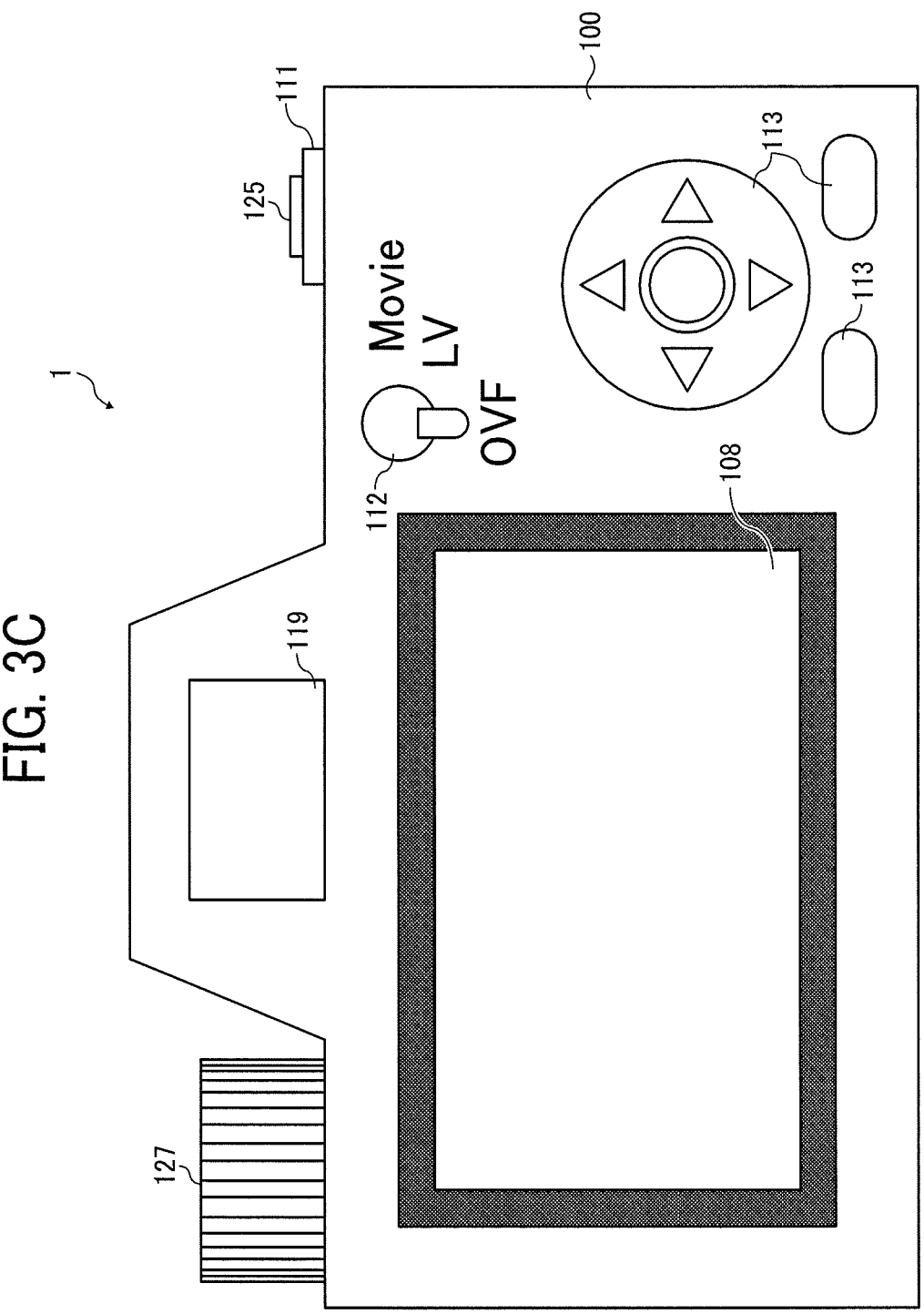

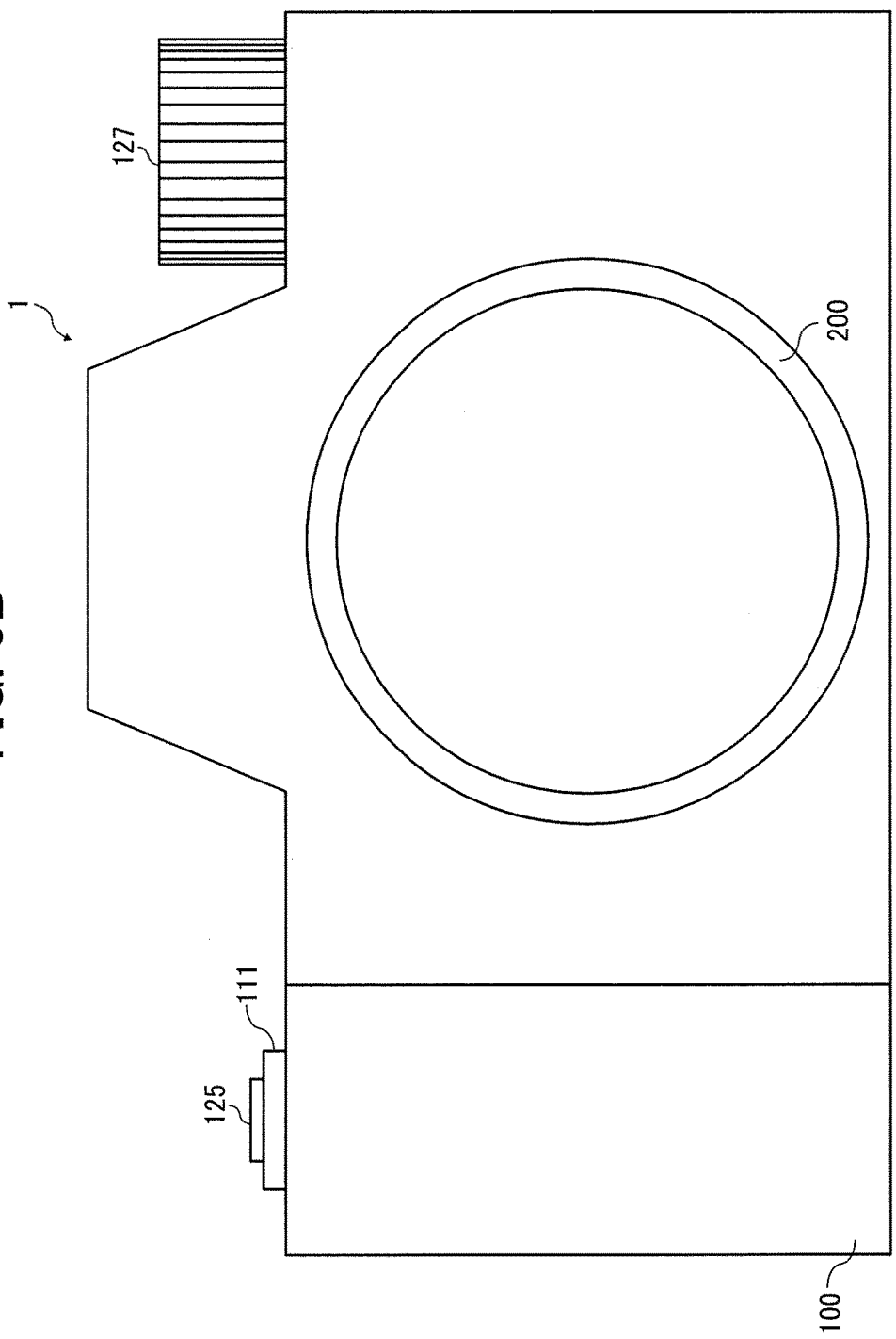

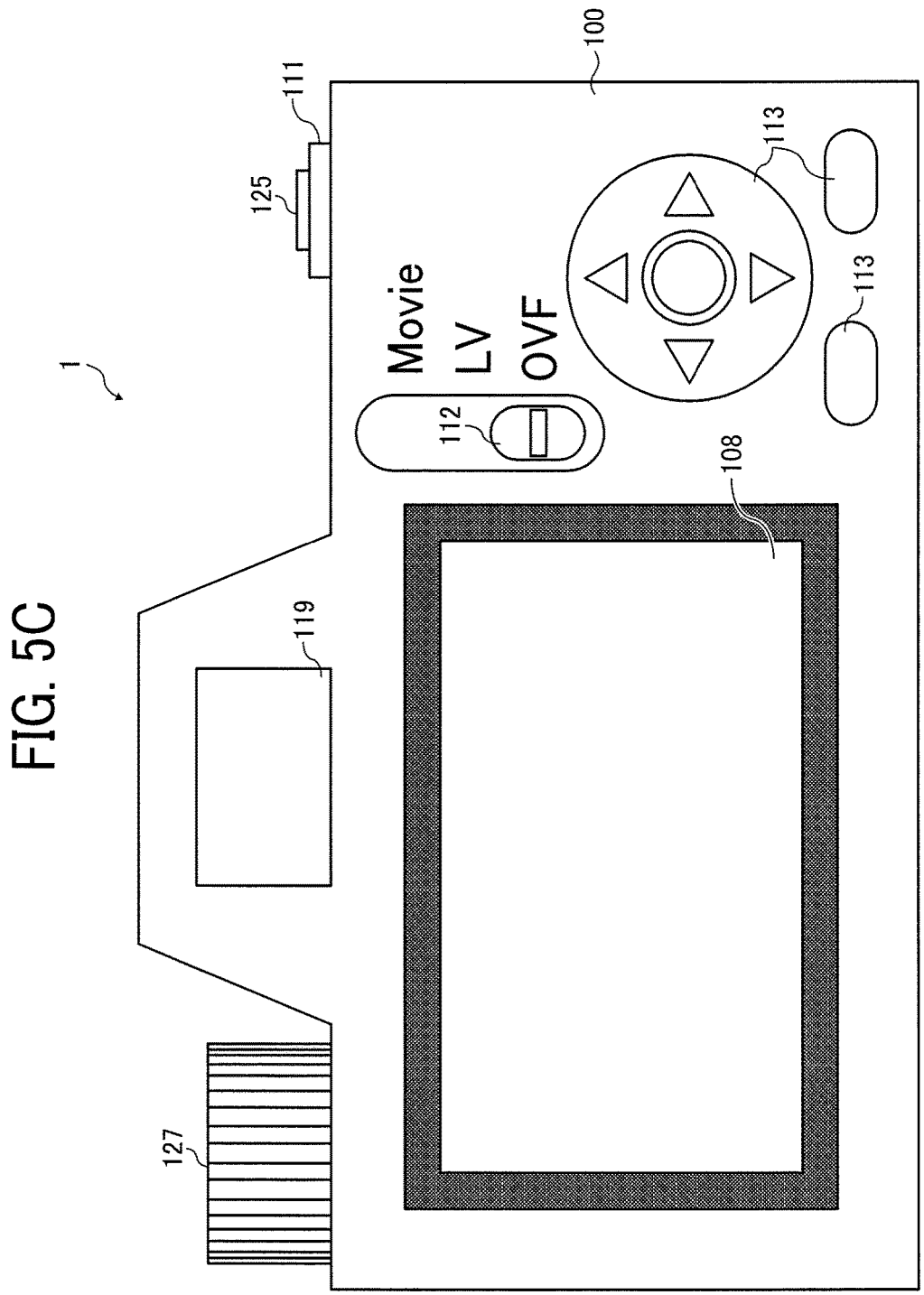

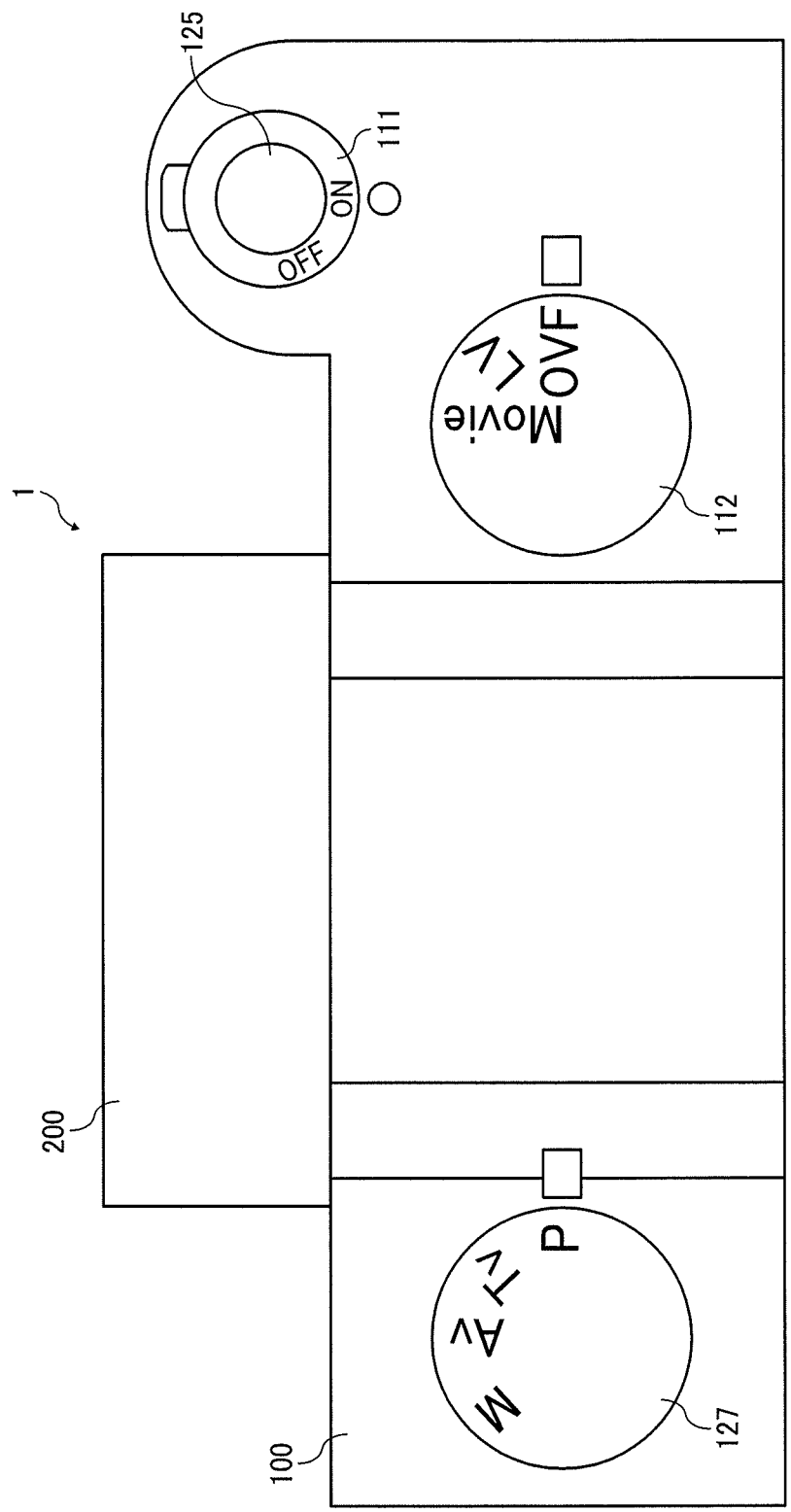

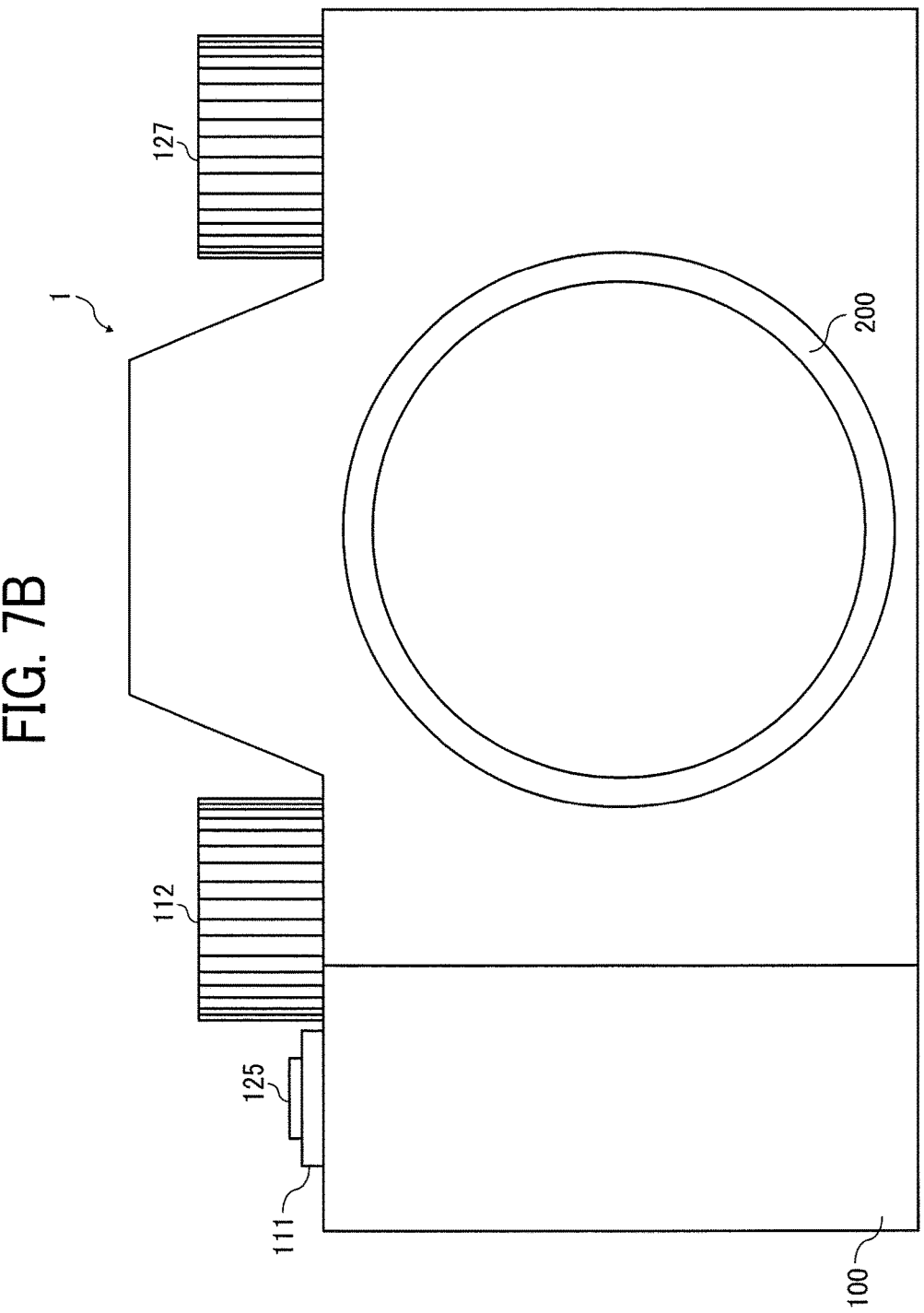

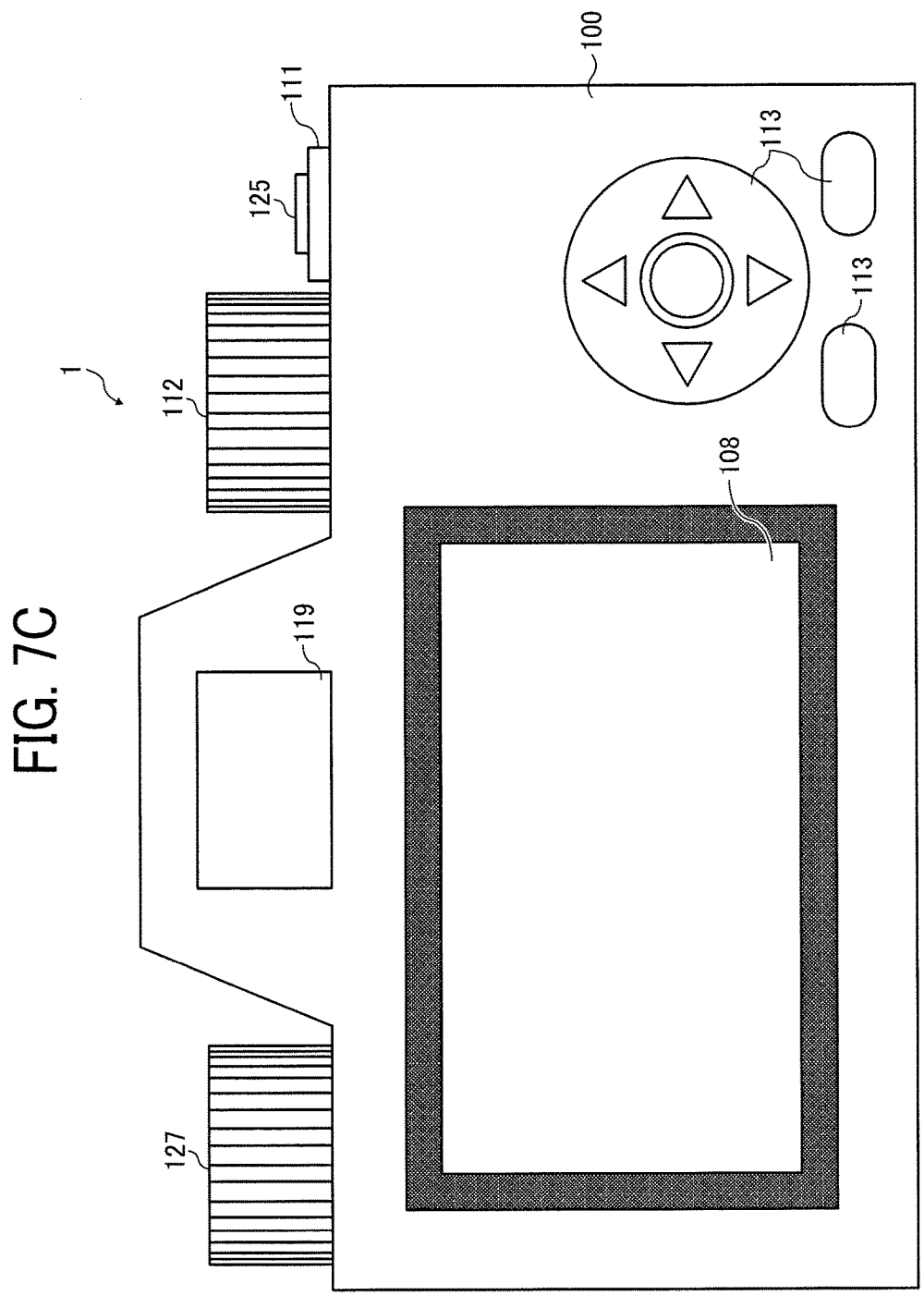

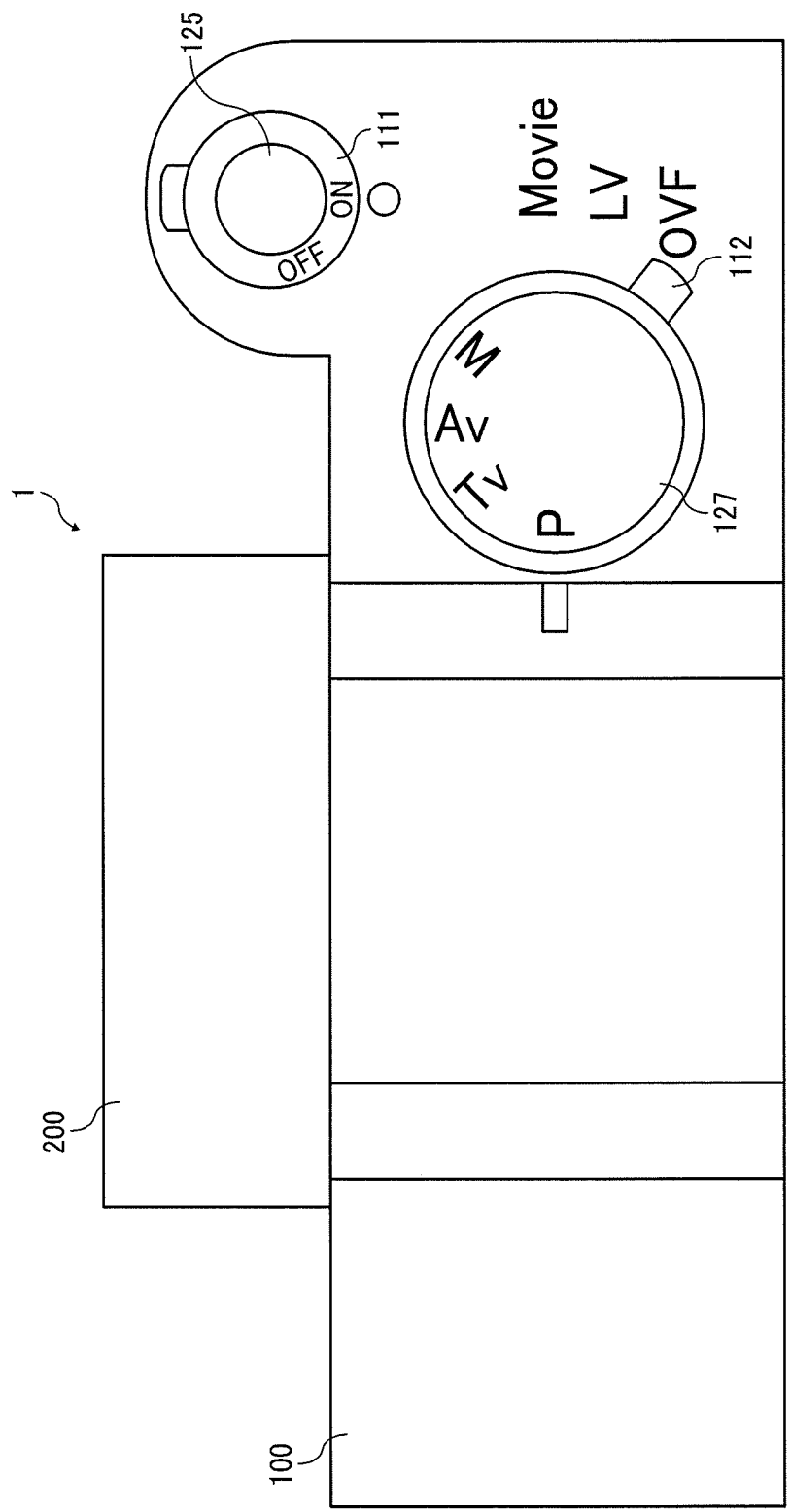

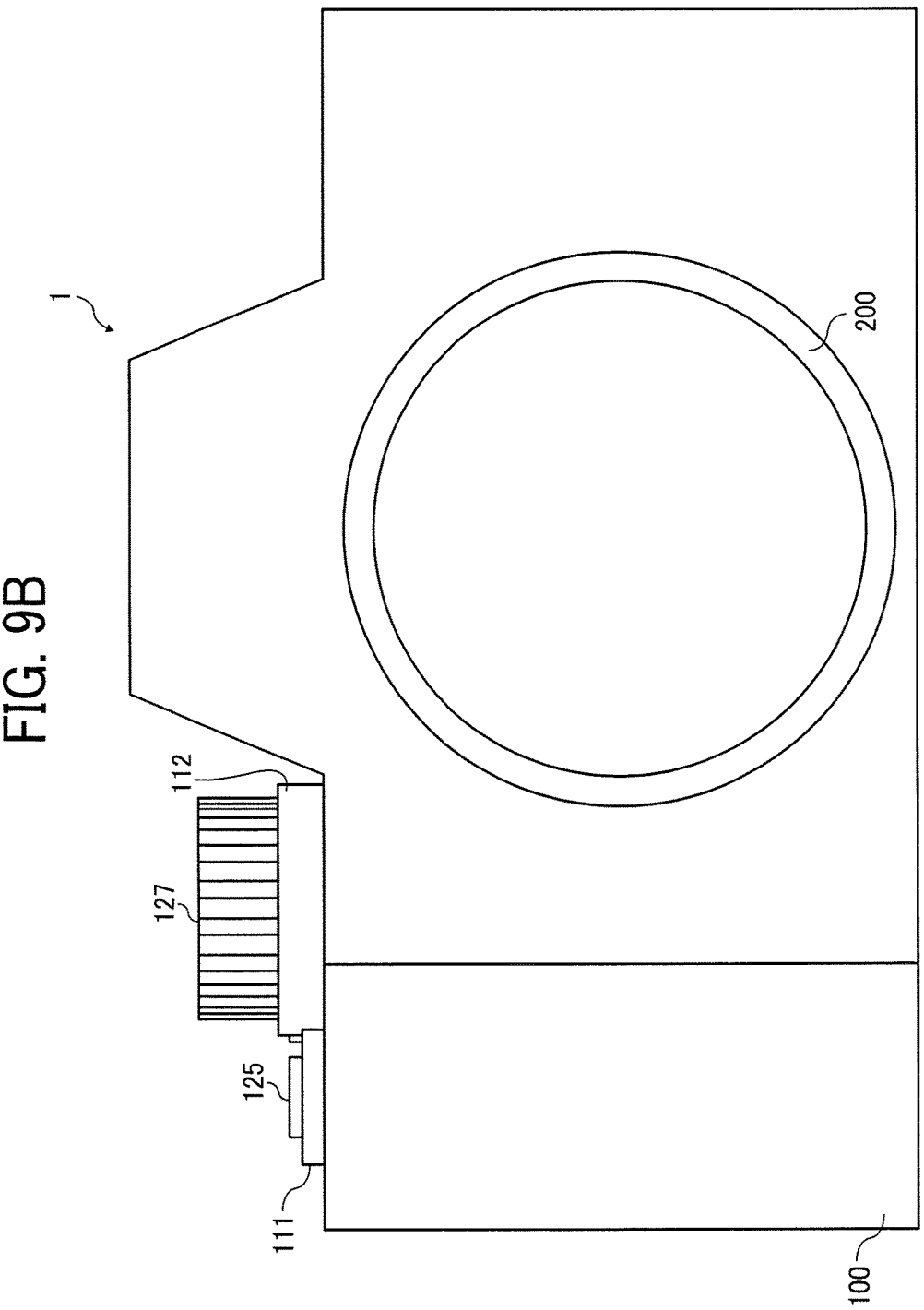

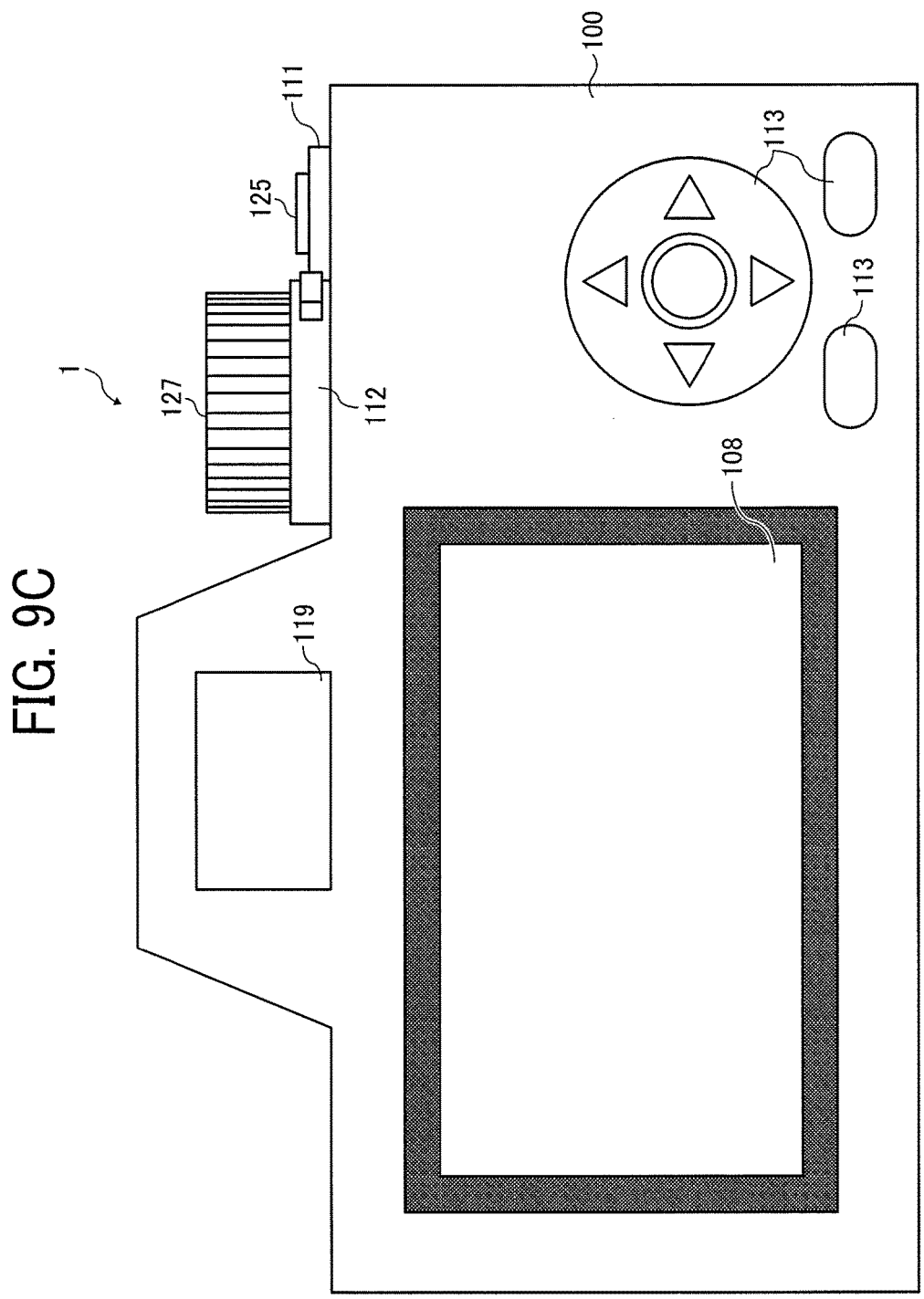

IMAGE CAPTURING DEVICE WITH A MODE SWITCH TO SET IMAGE-CAPTURING MODES

CROSS-REFERENCE TO RELATED APPLICATION

This patent application is based on and claims priority pursuant to 35 U.S.C. § 119(a) to Japanese Patent Application No. 2016-207048, filed on Oct. 21, 2016 in the Japan Patent Office, the entire disclosure of which is hereby incorporated by reference herein.

BACKGROUND

Technical Field

Embodiments of the present disclosure relate to an image capturing device.

Background Art

Image capturing devices, such as digital cameras, are known in the art to include an optical viewfinder and an image display such as a liquid crystal panel. With such a type of image capturing device, a user can check an object by looking through the optical viewfinder or looking at a live view displayed on the image display so as to perform an image-capturing operation.

SUMMARY

In one aspect of this disclosure, there is provided an improved image capturing device including a mode switch rotatable to change a pointing position movable between three predetermined positions corresponding to at least three image-capturing modes including a first mode, a second mode, and a third mode, to switch between the first mode, the second mode, and the third mode. The image capturing device further includes a power switch and circuitry. The power switch receives a user input for turning on or off the power of the image capturing devices. The circuitry controls the image capturing device to operate in one of the three image-capturing modes. When the power switch receives a user input for turning on the power, the circuitry controls the image capturing device to operate in one of the three image-capturing modes corresponding to the pointing position of the mode switch that has been set when the power switch is turned off.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIGS. 3A through 3C are external views of the image capturing device of FIG. 1 according to an embodiment of the present disclosure;

FIGS. 5A through 5C are external views of an image capturing device according to a variation of an embodiment of the present disclosure;

FIGS. 7A through 7C are external views of an image capturing device according to another variation of an embodiment of the present disclosure;

FIGS. 9A through 9C are external views of an image capturing device according to still another variation of an embodiment of the present disclosure.

Figure 1:
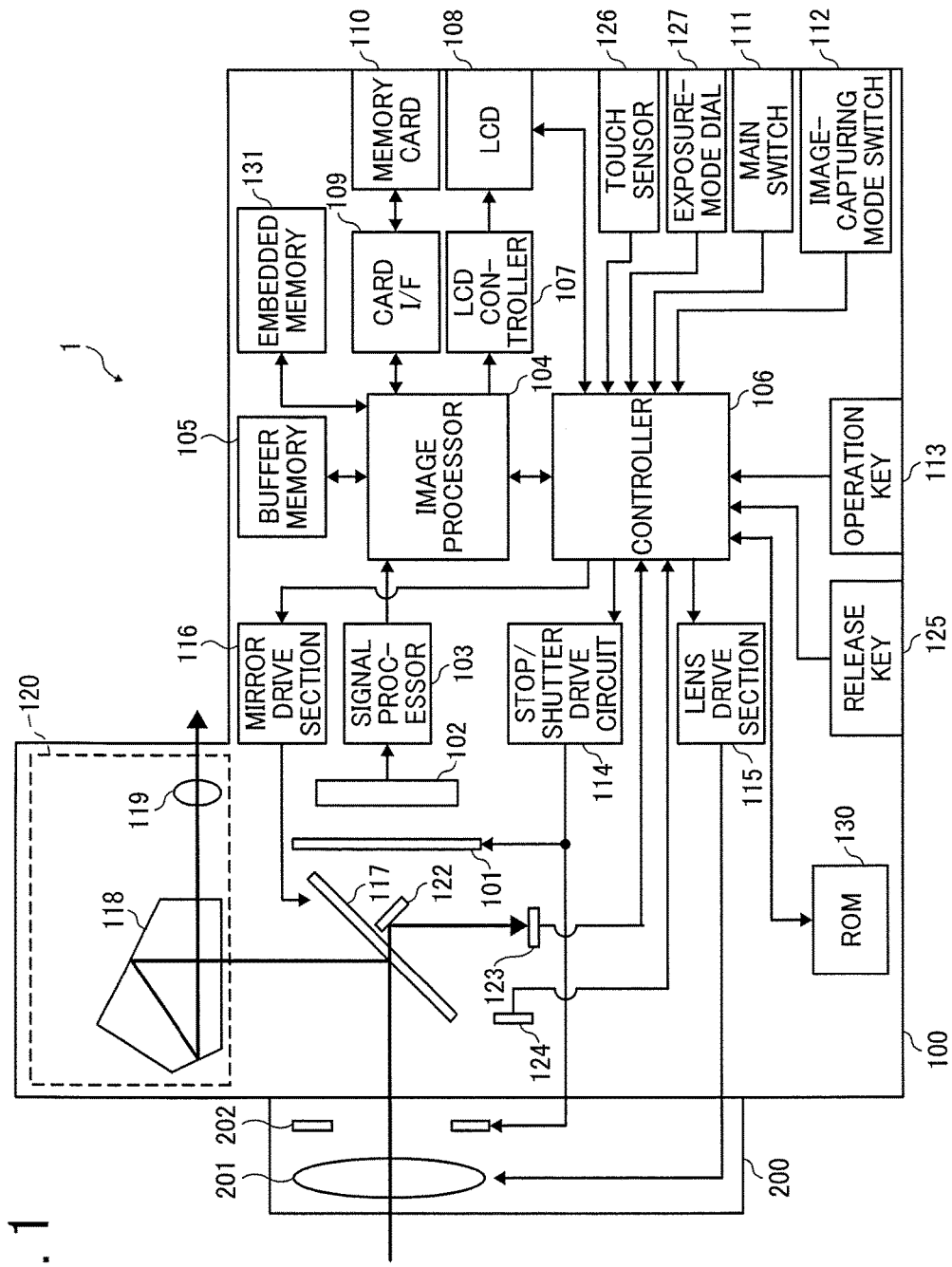
FIG. 1 is a block diagram of a configuration of an image capturing device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

Image capturing devices, such as digital cameras, are known in the art to include an optical viewfinder and an image display such as a liquid crystal panel. With such a type of image capturing device, a user can check an object by looking through the optical viewfinder or looking at a live view displayed on the image display so as to perform an image-capturing operation. Some image capturing devices, for example, include a mode switchable between an optical viewfinder mode and an electronic viewfinder mode. The optical viewfinder mode is for a user to view an object with the optical viewfinder to capture an image of the object. The electronic viewfinder is for the user to view the object with a live view (the electronic viewfinder) displayed on a display device to capture an image of the object. Such an image capturing device includes a key for switching an image-capturing mode. Every time such a key is pressed while the image capturing device is activated, the optical viewfinder mode and the electronic viewfinder mode are alternately switched.

However, with the above-described image capturing device, the user fails to tell which image-capturing mode of the optical viewfinder mode and the electronic viewfinder mode the image capturing device is set to when the image capturing device is turned off. For this reason, the user of such an image capturing device has to check the image-capturing mode after activating the image capturing device. Further, when such an image capturing device is set to the optical viewfinder mode on start-up, the user, who desires the electronic view mode, has to press the key to switch the image-capturing mode to the electronic viewfinder mode. Such a user might miss a chance to click the shutter for capturing an image of a desired object due to his/her action of checking or switching the image-capturing mode.

Hence, a configuration is proposed that allows the user to switch and recognize the image-capturing mode of the image capturing device while the image capturing device is not driven.

Hereinafter, a description is given of an image capturing device 1 according to one embodiment of the present disclosure, referring to the drawings. In the following description of the embodiment of the present disclosure, a digital single-lens reflex camera is described as the image capturing device.

Image Capturing Device

Figure 2:
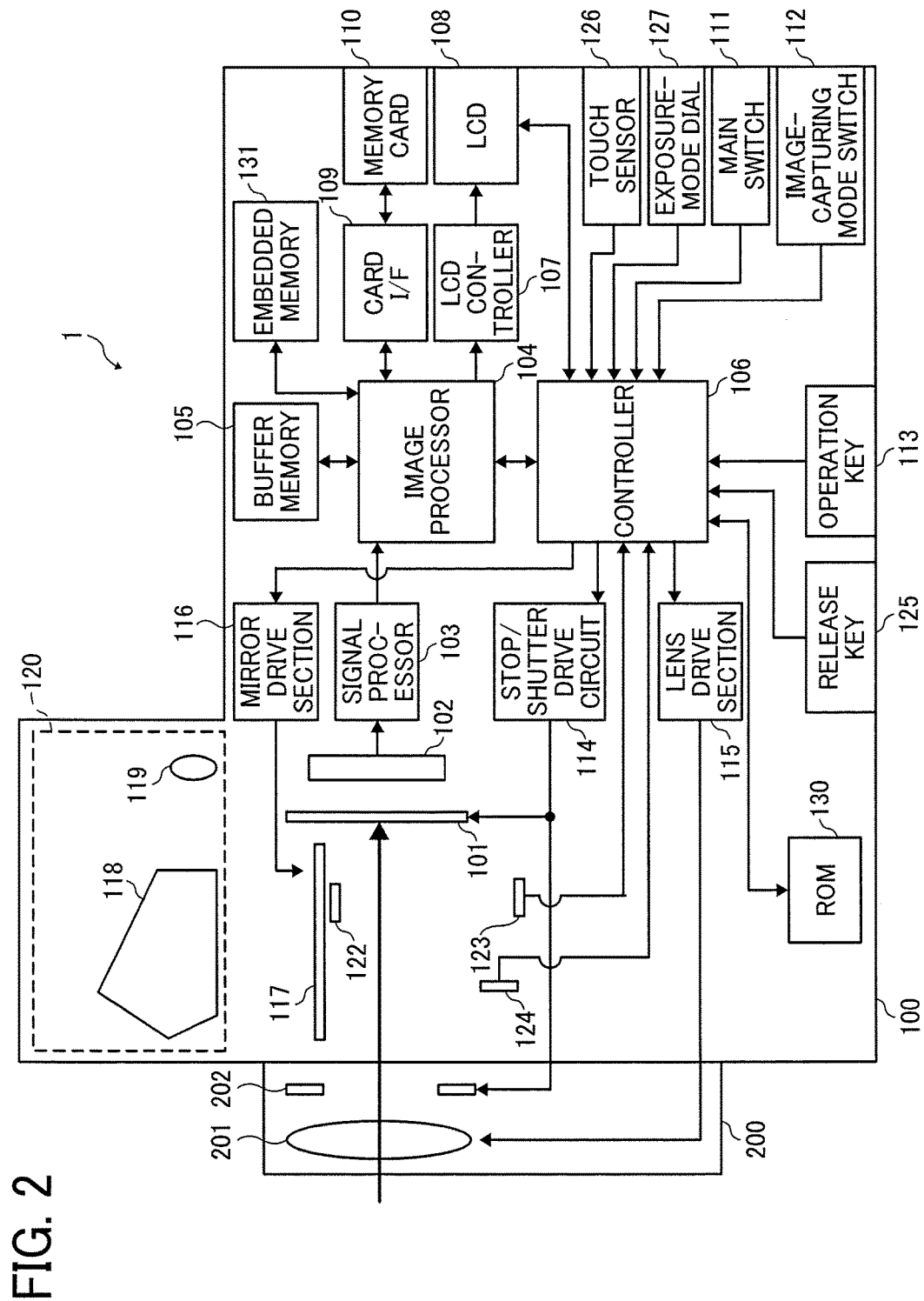
FIG. 2 is a block diagram of another configuration of the image capturing device of FIG. 1 according to an embodiment of the present disclosure.

FIG. 1 and FIG. 2 each is a block diagram of a configuration of the image capturing device 1 according to the embodiment of the present disclosure. In the image capturing device in FIG. 1, a first mirror 117 is in a mirror-down state. In the image capturing device 1 in FIG. 2, the first mirror 117 is in a mirror-up state. As illustrated in FIGS. 1 and 2, the image capturing device 1 includes a camera body 100 and an interchangeable lens 200 that is removably attached to the camera body 100.

The camera body 100 includes a shutter 101, an image sensor 102, a signal processor 103, an image processor 104, a buffer memory 105, a controller 106, a liquid crystal display (LCD) controller 107 as a first display controller or a second display controller, a LCD 108, a card interface 109, a memory card 110, a main switch 111 as a power switch, an image-capturing mode switch 112 as a mode switch, an operation key 113, a stop/shutter drive circuit 114, a lens drive section 115, a mirror drive section 116 as an optical-path switch, a first mirror 117, a viewfinder optical system 120, a second mirror 122, a distance-measuring sensor 123, a photometric sensor 124, a release key 125, a touch sensor 126 as an input receiver, an exposure mode dial 127, a read-only memory (ROM) 130, and an embedded memory 131. The viewfinder optical system 120 includes a pentaprism 118 and an eyepiece lens 119.

The interchangeable lens 200 includes an imaging optical system 201 and a stop 202. Note that, although the imaging optical system 201 consists of one lens in FIGS. 1 and 2, the imaging optical system 201 may consist of more lenses in some embodiments.

Figure 3B:
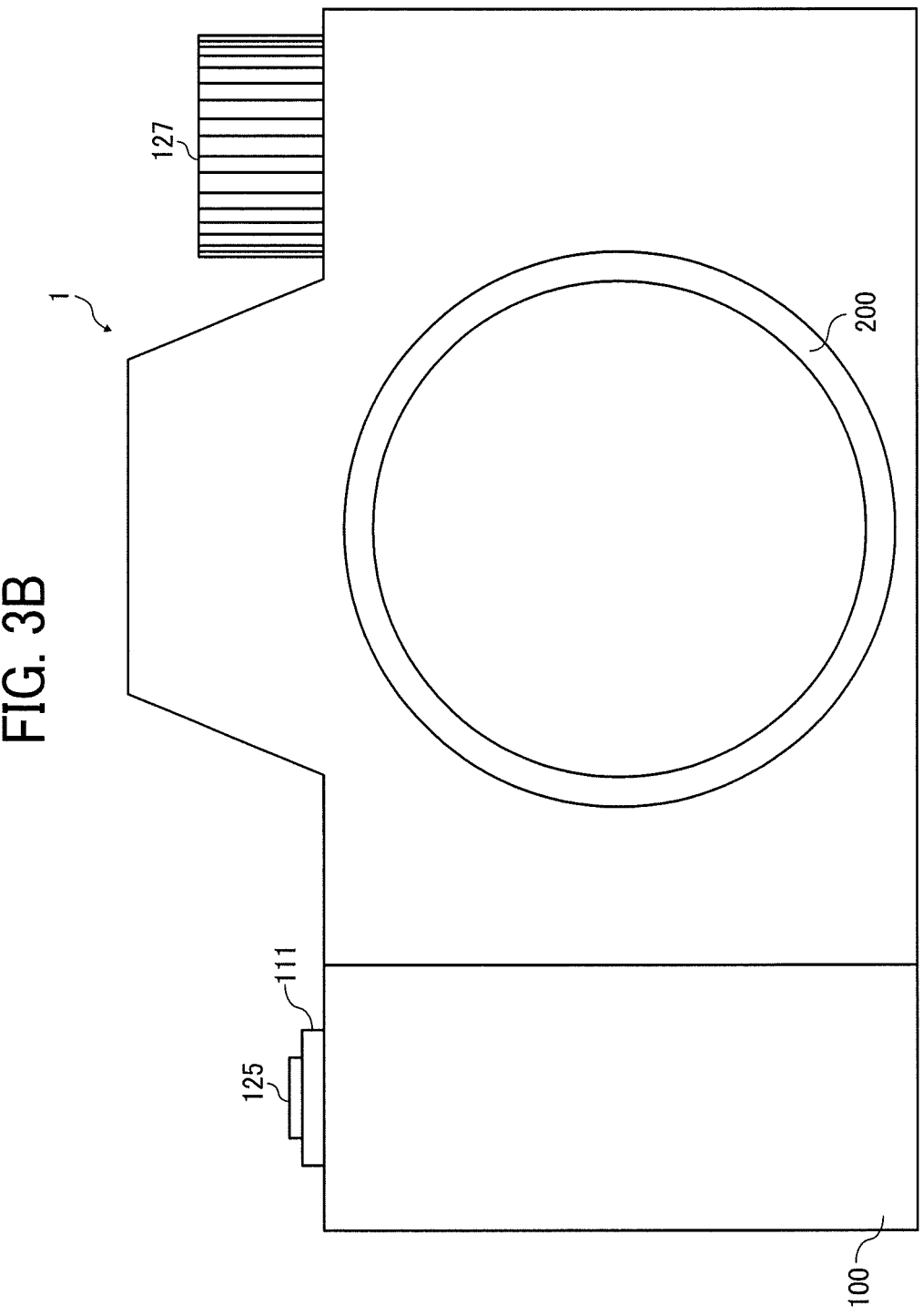

FIGS. 3A, 3B, and 3C are illustrations of a front view, a rear view, and a top view of the image capturing device 1, respectively. The camera body 100 of the image capturing device 1 includes various switches and keys, such as the main switch 111, the release key 125, the image-capturing mode switch 112, and the operation key 113, which allow the user to operate the image capturing device. The operation key 113 includes switches and keys for various settings of the image capturing device 1. The interchangeable lens 200 is removably attached to one surface of the camera body 100. The camera body 100 includes the LCD on another surface at the opposite side of the one surface to which the interchangeable lens 200 is attached. The LCD 108 is used to display a live view of an image of an object or various pieces of information. In response to the operation of the main switch 111 by the user, the various circuits of the image capturing device 1 are powered from a battery via a power-supply line.

The controller 106 controls the image capturing device 1 by accessing the ROM 103 within the image capturing device 1 after the power supply so as to readout a control program.

The image-capturing mode switch 112 is disposed on a position that helps the user in capturing an image with the image capturing device 1 to easily recognize and operate the image-capturing mode switch 112. In the configuration illustrated in FIG. 3C, the image-capturing mode switch 112 is disposed on the back side of the camera body 100, on which the LCD 108 is disposed. The image-capturing mode switch 112 is used to switch the image-capturing mode of the image capturing device 1. The image-capturing mode of the image capturing device 1 has a still-image capturing mode to capture a still image and a moving-image capturing mode to capture a moving image. The still-image capturing mode includes an optical viewfinder mode to view an object through the eyepiece lens 119 and capture a still image of the object and an electronic viewfinder mode to check a live view of an image of an object displayed on the LCD 108 and capture a still image of the object. The moving-image capturing mode is to check a live view of an moving image of an object displayed on the LCD and capture a moving-image of the object.

Figure 4A:
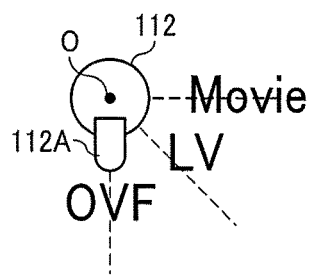
FIGS. 4A through 4C are external views of the image-capturing mode switch according to an embodiment of the present disclosure.
Figure 4B:
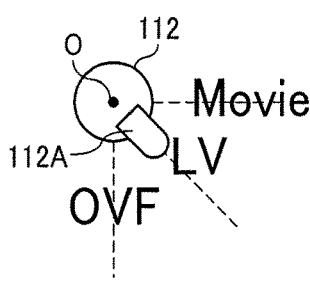
Figure 4C:
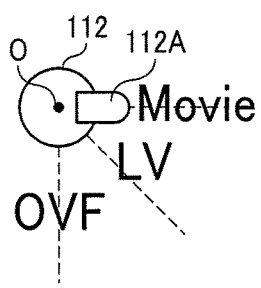
Figure 5A:
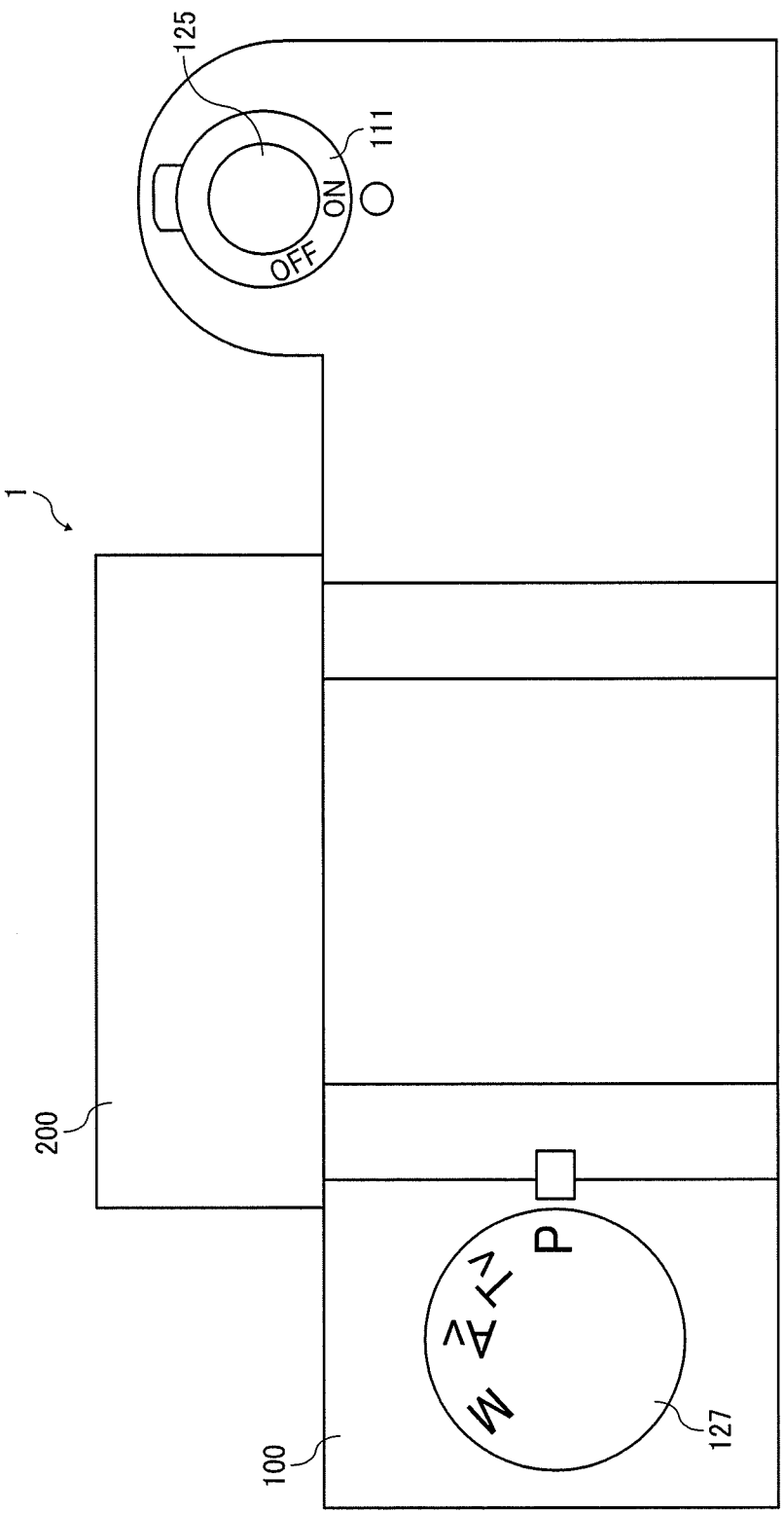
Figure 6A:
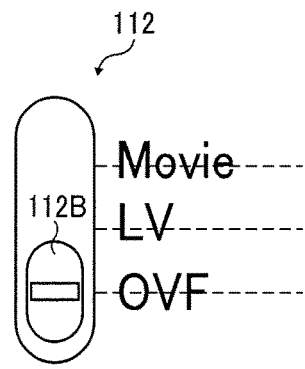
FIGS. 6A through 6C are external views of an image-capturing mode switch according to a variation of an embodiment of the present disclosure.
Figure 6B:
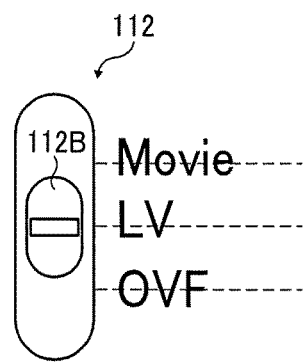
Figure 6C:
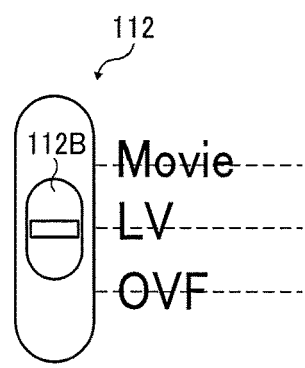
Figure 8A:
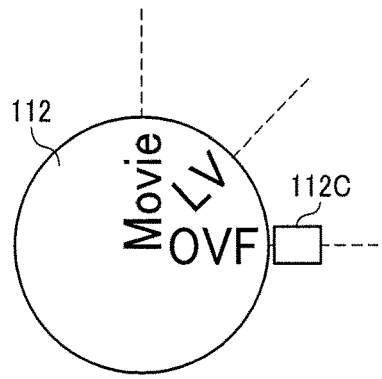
FIGS. 8A through 8C are external views of an image-capturing mode switch according to another variation of an embodiment of the present disclosure.
Figure 8B:
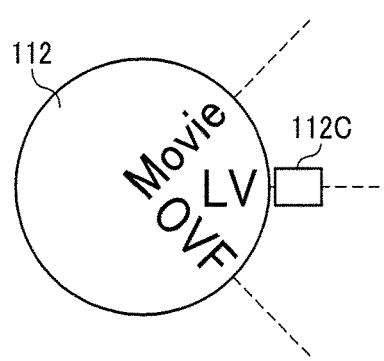
Figure 8C:
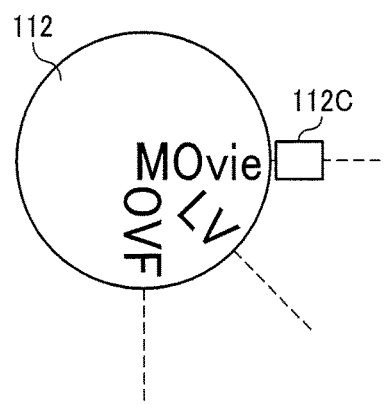
Figure 10A:
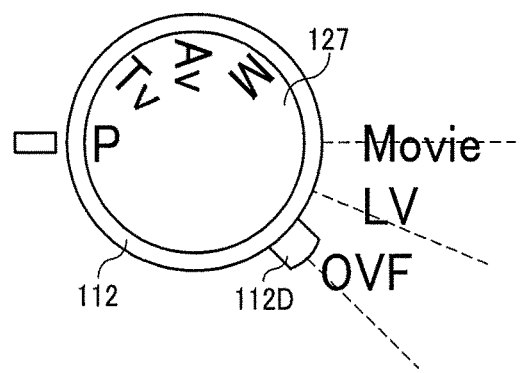
FIGS. 10A through 10C are external views of an image-capturing mode switch according to still another variation of an embodiment of the present disclosure.
Figure 10B:
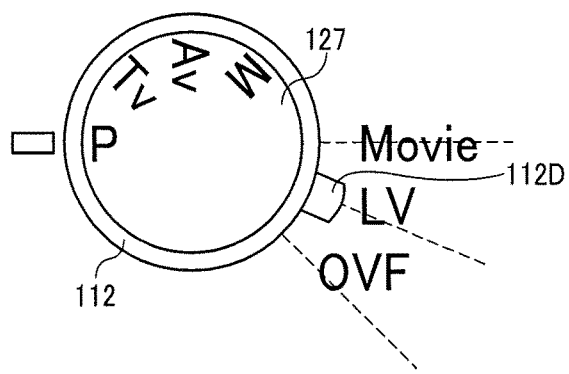
Figure 10C:
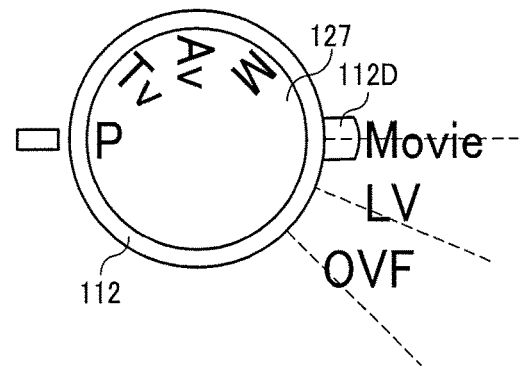

FIGS. 4A, 4B, and 4C are illustrations of the image-capturing mode switch 112. The image-capturing mode switch 112 rotates around an axis O. Further, the image-capturing mode switch 112 is an index lever that is rotationally moved and fixed at a predetermined position. In the present embodiment, the image-capturing mode switch 112 is rotationally moved and stopped at three predetermined positions corresponding to the optical viewfinder mode (the still-image capturing mode), the electronic viewfinder mode (the still-image capturing mode), and the moving-image capturing mode, respectively. Any symbol that represents an image-capturing mode, e.g., a character string, is described at each predetermined position. When the user rotatably moves a lever 112A of the image-capturing mode switch 112 up to any of the three predetermined positions, the image capturing device 1 switches the image-capturing mode to the image-capturing mode corresponding to the position of the lever 112A.

In the present embodiment, the image-capturing mode switch 112 is separate from the main switch 111. With such a configuration, the image capturing device 1 allows the user to operate the image-capturing mode switch 112 in any case at which the image capturing device 1 is powered on or at which the image capturing device 1 is powered off. Further, such a configuration allows the user to know at which image-capturing mode the image capturing device 1 is to be activated by looking at the position of the lever 112A of the image-capturing mode switch 112, even when the image capturing device 1 is powered off. When the image-capturing mode switch 112 is operated by the user with the image capturing device powered off and the image capturing device 1 is subsequently powered on, the image capturing device 1 operates at the image-capturing mode according to the position of the lever 112A. When the image-capturing mode switch 112 is operated with the image capturing device 1 powered on, the image capturing device 1 switches the image-capturing mode accordingly.

Still-Image Capturing Process at Optical Viewfinder Mode

When the image capturing device 1 has the image-capturing mode at the optical viewfinder mode, the mirror drive section 116 drives the first mirror 117 to be disposed in the optical path of light rays (object light rays) having been emitted from the object and passed through the imaging optical system 201. The object light rays are reflected by the first mirror 117 and directed toward the viewfinder optical system 120.

The viewfinder optical system 120 includes the pentaprism 118 and the eyepiece lens 119. The object light rays having entered the viewfinder optical system 120 is reflected by each reflecting surface of the pentaprism 118 to be an erected image and is directed toward the eyepiece lens 119. The eyepiece lens 119 forms an image of the object light rays again as a virtual image suitable for observation by the user. The user can observe the object image (virtual image) reformed by the eyepiece lens 119, by looking through the eyepiece lens 119.

When the release key 125 is half-pressed by the user, the controller 106 performs an auto-focus (AF) control based on the object light rays. Specifically, the object light rays having passed through the imaging optical system 201 and the stop 202 enter the first mirror 117. A partial area of the first mirror 117 is a half mirror area. Therefore, some of the object light rays passing through the first mirror 117 (half mirror area), are reflected downward by the second mirror 122 disposed at the rear stage of the first mirror 117, and are directed to the distance measuring sensor 123.

The distance measuring sensor 123 outputs a signal corresponding to the light rays having entered the distance measuring sensor 123, to the controller 106. The controller 106 performs a defocus calculation based on a signal input from the distance measuring sensor and outputs a focus control signal obtained by the calculation to the lens driving section 115.

The lens driving section 115 relatively moves some lenses (focus lenses) of the imaging optical system 201 relative to the other lenses in the optical axis direction based on the focus control signal, which adjusts the focus position of the imaging optical system 201 to the proper position.

Further, for example, when the release key 125 is fully pressed, the controller 106 controls the drive of the shutter 101 via the stop/shutter drive circuit 114, and also outputs an aperture control signal to the stop 202, so as to obtain proper exposure based on the photometric value of the photometric sensor 124 (in other words, the brightness of the object).

The stop 202 is changed with the aperture control signal. The drive control of the shutter 101 and the stop 202 is performed based on an automatic exposure (AE) function specified by the exposure-mode dial 127, such as a program AE, a shutter priority AE, and a stop priority AE.

The controller 106 quickly returns the first mirror 117 using the mirror driving section 116. That is, the controller 106 evacuates the first mirror 117 from the optical path of the object light rays only in the period from the time immediately before the start of the leading curtain traveling of the shutter 101 (in this case, the focal plane shutter) to the time immediately after the end of the trailing curtain traveling of the shutter 101. Further, the second mirror 122 mechanically operates with the first mirror 117, and is retracted from the optical path of the object light rays together with the first mirror 117.

While the first mirror 117 and the second mirror 122 are retracted from the optical path, the object light rays pass through the imaging optical system 201, the stop 202, and the shutter 101, and is received by light-receiving surface of the image sensor 102 disposed at the subsequent stage of the shutter 101. Thus, an image of the object light rays is formed on the light-receiving surface of the image sensor 102.

The image sensor 102 is a chip of a Complementary Metal Oxide Semiconductor (CMOS) image sensor and peripheral circuits thereof. The CMOS image sensor is a two-dimensional single plate color sensor in which a primary color mosaic filter of Bayer arrangement is formed on-chip. The image sensor 102 accumulates the optical image formed by each pixel on the light-receiving surface as electric charges according to the light intensity, and generates an image signal, outputting the generated image signal to the signal processor 103. The CMOS image sensor is not limited to the primary color filter such as a Bayer array filter, but may be a complementary color filter (for example, a complementary color checkered filter). Further, the image sensor 102 may be a chip of a Charge Coupled Device (CCD) image sensor and peripheral circuits thereof.

The signal processor 103 performs predetermined signal processing such as clamping, demosaicing, and the like on the image signal input from the image sensor 102, and outputs the processed image signal to the image processor 104. The image processor 104 subjects the image signal input from the signal processor 103 to predetermined signal processing such as matrix calculation, luminance/chroma (Y/C) separation, and white balance to generate a luminance signal Y and color difference signals Cb and C. The image processor 104 further compresses those signals into a predetermined format, such as a Joint Photographic Experts Group (JPEG), to generate a captured image (still image data). The buffer memory 105 is used as a temporary storage area for processing data during the processing of the image processor 104. In addition, the data format of the captured image is not limited to the JPEG format, and may be a RAW format in which only the minimum image processing (for example, correction of the black level) is performed.

In the card slot of the card interface 109, a memory card 110 is detachably inserted.

The image processor 104 can communicate with the memory card 110 via the card interface 109. The image processor 104 stores the generated captured image (still image data) in the memory card 110. The storage destination of the captured image is not limited to the memory card 110, and may be stored in the built-in memory 131 included in the image capturing device 1.

Still Image Capturing Process in Electronic Viewfinder Mode

When the image-capturing mode of the image capturing device 1 is the electronic viewfinder mode, the mirror drive section 116 maintains the state in which the first mirror 117 and the second mirror 122 are retracted from the optical path of the object light rays. Accordingly, an image of the object light rays is constantly formed on the light-receiving surface of the image sensor 102.

The image sensor 102 outputs an image signal according to the received object light rays to the signal processor 103. The signal processor 103 performs predetermined signal processing on the image signal input from the image sensor 102 and outputs the processed signal to the image processor 104.

The image processor 104 performs predetermined signal processing on the image signal to generate a luminance signal Y and color difference signals Cb and Cr. The generated luminance signal Y and color difference signals Cb and Cr are buffered in the buffer memory 105 on a frame basis. The image processing unit 104 sweeps out the buffered signal from the buffer memory 105 at a predetermined timing and converts the signal into a video signal of a predetermined format, outputting the video signal to the LCD controller 107. The LCD controller 107 modulates and controls the LCD 108 based on the image signal input from the image processor 104. Accordingly, the object image is displayed on the display screen of the LCD 108. The user can visually recognize the live view in real time on the display screen of the LCD 108.

When the release key 125 is half-pressed by the user while the live view is displayed on the LCD 108, the controller 106 performs the AF control using the image signal. For the AF control, for example, a contrast detection method or an image plane phase difference detection method is adopted. With such an AF control, the focus position of the imaging optical system 201 is adjusted to an appropriate position.

When the release key 125 is fully pressed by the user, the controller 106 drives and controls the shutter 101 via the stop/shutter drive circuit 114 while outputting an aperture control signal to the stop 202 so as to obtain proper exposure based on the signal level of the image signal. The stop 202 changes the aperture value based on the aperture control signal.

The image sensor 102 accumulates the optical image formed by each pixel on the light-receiving surface as electric charges according to the light intensity, and generates an image signal, outputting the generated image signal to the signal processor 103.

The image signal output from the image sensor 102 is subjected to predetermined signal processing by the signal processor 103 and the image processor 104. A captured image (still image data) generated by performing signal processing on the image signal is stored in the memory card 110. The storage destination of the still image data is not limited to the memory card 110, and may be the embedded memory 131 included in the image capturing device 1.

Moving Image Capturing Process in Moving-Image Capturing Mode

When the image-capturing mode of the image capturing device 1 is the moving-image capturing mode, the mirror drive section 116 retracts the first mirror 117 and the second mirror 122 from the optical path of the object light rays, and maintains such a state. Also, as in the electronic viewfinder mode, the live view of the object image is displayed on the LCD 108.

When an instruction to start capturing a moving image is input to the release key 125, the image processor 104 compresses the image signals sequentially input from the signal processing unit 103 into a predetermined format such as Moving Picture Experts Group (MPEG) 2 to thereby generate moving image data. The generated moving image data is recorded in the memory card 110 via the card interface 109. The storage destination of the moving image data is not limited to the memory card 110, and may be the built-in memory included in the image capturing device 1. Furthermore, the standard of moving image data is not limited to MPEG 2, and may be another standard such as MPEG 4, for example.

Reproduction Processing

When the captured image is reproduced by the user, the image processor 104 reads out the still image data or the moving image data specified by the operation, from the memory card 110 or the built-in memory 131, and converts the readout data into an image signal of a predetermined format, outputting the image signal to the LCD controller 107. The LCD controller 107 modulates and controls the liquid crystal based on the image signal input from the image processor 104, so that the captured image of the object is displayed on the display screen of the LCD 108.

According to the present embodiment, since the image-capturing mode of the image capturing device 1 is switched according to the stationary position of the lever 112A of the image-capturing mode switch 112, the user can recognize the image-capturing mode of the image capturing device 1 at a time when the user looks at the position of the lever 112A. Further, by previously setting the position of the lever 112A at a position corresponding to the image-capturing mode that is frequently used by the user, there is no need for the user to switch the image-capturing mode after the image capturing device 1 is driven. With such a configuration, the time from when the image capturing device 1 is driven to when image capturing is started is shortened, thus preventing the user from missing the shutter chance.

As described above, the image capturing device 1 according to the present embodiment differs in image-capturing processing of a still image (or a moving image) according to the image-capturing mode. In the optical viewfinder mode for example, the first mirror 117 and the second mirror 122 are in a mirror-down state, arranged in the optical path of the object light rays while the release key 125 is not fully depressed. By contrast, in the electronic viewfinder mode or the moving-image capturing mode, the first mirror 117 and the second mirror 122 are in a mirror-up state at which the first mirror 117 and the second mirror 122 are always evacuated from the optical path of the object light rays. With such a configuration, when the image-capturing mode of the image capturing device 1 is switched while the image capturing device 1 is being driven, each of the first mirror 117 and the second mirror 122 are switched between the mirror-down state and the mirror-up state. However, when the first mirror 117 and the second mirror 122 are moved to switch the states thereof, power for moving the first mirror 117 and the second mirror 122 might be consumed or the movement of the first mirror 117 and the second mirror 122 might generate vibration on the image capturing device 1. To handle such circumstances, the image capturing device 1 according to the present embodiment includes the first mirror 117 and the second mirror 122 such that the states of the first mirror 117 and the second mirror 122 can not be switched unless necessary.

As shown in FIGS. 4A through 4C, the image-capturing mode switch 112 according to the present embodiment includes the lever 112A such that the lever 112A can be rotated to a position corresponding to the image-capturing mode. The position ("LV" in FIGS. 4A through 4C) corresponding to the electronic viewfinder mode of the image-capturing mode switch 112 is disposed between the position ("OVF") corresponding to the optical viewfinder mode and the position ("Movie") corresponding to the moving-image capturing mode. When the position of the lever 112A is sequentially rotated to the positions illustrated in FIGS. 4A through 4C, respectively, the image-capturing mode of the image capturing device 1 is switched to the optical viewfinder mode, the electronic viewfinder mode, and the moving-image capturing mode in that order. Further, when the photographing mode is switched between the optical finder mode and the electronic viewfinder mode, the first mirror 117 and the second mirror 122 are switched between the mirror-down state and the mirror-up state. When the image capturing mode is switched between the electronic finder mode and the moving-image capturing mode, the first mirror 117 and the second mirror 122 are maintained in the mirror-up state.

In the present embodiment as described above, since the position corresponding to the electronic viewfinder mode of the image-capturing mode switch 112 and the position corresponding to the moving-image capturing mode are arranged adjacent to each other, the first mirror 117 and the second mirror 122 do not have to be moved to be in the mirror-down state when the image-capturing mode is switched between the electronic viewfinder mode and moving-image capturing mode. Such a configuration can prevent consumption of electric power and the occurrence of the vibration of the image capturing device 1 due to the drive of the first mirror 117 and the second mirror 122.

Further, in the present embodiment, the position corresponding to the optical viewfinder mode and the position corresponding to the electronic viewfinder mode are arranged adjacent to each other in the image-capturing mode switch 112. Such a configuration can prevent erroneously switching the image-capturing mode of the image capturing device 1 to the moving-image capturing mode when the user switches the image-capturing mode for capturing a still image between the optical viewfinder mode and the electronic viewfinder mode.

In the configuration illustrated in FIGS. 4A through 4C, the lever 112A of the image-capturing mode switch 112 can be rotated (moved) between positions corresponding to three image-capturing modes (optical viewfinder mode, electronic viewfinder mode, moving-image capturing mode). However, the present embodiment is not limited to this configuration. For example, the lever 112A of the image-capturing mode switch 112 may be movable to a position corresponding to a mode other than the three image-capturing modes. For example, in addition to the three image-capturing modes, the lever 112A may be movable to a position corresponding to a mode for reproducing image data stored in the memory card 110 or the like.

Further, in the present embodiment, the LCD 108 of the image capturing device 1 can display information other than the image based on the live view of the object, captured-image data, or moving-image data. For example, the LCD 108 displays letters and characters, symbols or the like representing the state (information regarding the device) of the image capturing device 1, such as the exposure mode of the image capturing device 1, the shutter speed, the setting value of the stop 202, the date and time, the inclination of the image capturing device 1. On the LCD 108, the above-described information regarding the device (device information) can be displayed on its own or superimposed on an image based on a live view or image data. Further, the operating of the operation key 113 allows switching whether to display the device information on the LCD 108 or not.

For example, when the image-capturing mode of the image capturing device 1 is the optical viewfinder mode, the live view of the object is not displayed on the LCD 108. In such a case, the LCD controller 107 switches between displaying only the device information on the LCD 108 or displaying nothing on the LCD 108, according to the operation on the operation key 113. For example, when the device information is displayed on the LCD 108 in capturing an image under the dark environment. e.g., during the night or in a dark place, the light emitted from the LCD 108 may adversely affect the captured image. To avoid such circumstances, the image capturing device 1 according to the present embodiment can switch the setting to display nothing on the LCD 108 when the image-capturing mode is the optical viewfinder mode. This configuration can prevent an adverse effect on the captured image due to the light emitted from the LCD 108.

When the image-capturing mode of the image capturing device 1 is the electronic viewfinder mode or the moving-image capturing mode, the live view of the object is displayed on the LCD 108. In this case, the LCD controller 107 switches the setting regarding whether only the live view is displayed on the LCD 108 or the device information is superimposed on the live view to be displayed on the LCD 108 according to the operation on the operation key 113. The display control of the LCD 108 in the optical viewfinder mode and the display control of the LCD 108 in the electronic viewfinder mode or the moving-image capturing mode may be executed according to the operation on the same operation key 113.

Further, in the present embodiment, when the user switches the image-capturing mode between the electronic viewfinder mode and the moving-image capturing mode, using the image capturing mode switch 112, the image capturing device 1 maintains the setting regarding whether only the live view is displayed on the LCD 108 or the device information is superimposed on the live view to be displayed on the LCD 108. With such a configuration, the user does not have to switch the display content of the LCD 108 each time the image-capturing mode is switched, and the operation of the operation unit 113 can be minimized. Further, even when the user switches the image-capturing mode between the electronic viewfinder mode and the moving-image capturing mode, the display content of the LCD 108 (only the live view displayed on the LCD 108 or the device information superimposed on the live view, which is displayed on the LCD 108) does not change. This can prevent the user from feeling uncomfortable with the display content of the LCD 108.

In addition, the LCD 108 according to the present embodiment may include a touch sensor 126 that detects contact of, e.g., a user's finger and receives an input. In this case, by touching the LCD 108, the user can select various settings of the image capturing device or input set values. For example, the user performs the input operation by touching the LCD that is displaying the live view, and selects an area to be subjected to the AF control or the AE control from the object image displayed as the live view.

In the present embodiment, the image capturing device 1 may determine (switch) whether the touch sensor 126 receives an input, which is performed by the user's touching the LCD 108, according to the image-capturing mode of the image capturing device 1. For example, when the image capturing device 1, which is set to the electronic viewfinder mode or the moving-image capturing mode as the image-capturing mode, is ready and waiting for capturing an image (in a standby mode), i.e., waiting for the user to depress the release key 125, the touch sensor 126 receives an input by the user's touching the LCD 108. Such a configuration allows the user to select an area to be subjected to the AF control or the AE control while checking the live view displayed on the LCD 108.

When the image capturing device 1 is switched to the optical viewfinder mode as the image capturing mode, the touch sensor 126 is set not to receive the input by touch while the image capturing device 1 is in the standby mode. In the optical viewfinder mode, the user looks through the eyepiece lens 119 and checks the object. At this time, if the touch sensor is set to receive an input by the user's touch, the image capturing device 1 might erroneously operate in response to the unintentional contact of the user's nose or cheek with the LCD 108 (the touch sensor 126). To avoid such circumstances, in the present embodiment, the touch sensor 126 does not receive an input by touch when the image capturing device 1 is set to the optical viewfinder mode as the image-capturing mode and is in the standby mode. This configuration can prevent an erroneous operation of the image capturing device 1.

Even if the image-capturing mode is set to the optical viewfinder mode, the touch sensor 126 may be set to receive an input by touch while the image capturing device 1 is not in the standby mode. For example, the user operates the operation key 113 to start performing various settings of the image capturing device 1 while the image capturing device is in the standby mode. When the standby mode of the image capturing device 1 is canceled, the touch sensor 126 may receive an operation input for performing the various settings of the image capturing device 1.

The foregoing is a description of an exemplary embodiment of the present disclosure. The embodiment of the present disclosure is not limited to those described above, and various variations are possible within the scope of the technical idea of the present disclosure. For example, the present disclosure also includes the combinations of an embodiment clearly exemplified in the specification or obvious embodiments.

For example, the image-capturing mode switch 112 according to the present embodiment is not limited to the configuration illustrated in FIGS. 4A through 4C. FIGS. 5A through 5C and 6A through 6C are external views of the image capturing device 1 and the image-capturing mode switch 112 according to the variation of the present embodiment. In the present variation, the image-capturing mode switch 112 is disposed on the back side of the camera body 100. The image-capturing mode switch 112 has a knob 112B movable up and down, and can be stopped at three predetermined positions corresponding to the image-capturing mode. In the area of the camera body 100 adjacent to the predetermined position where the knob 112D can be stopped, a symbol (for example, a character string) indicating the corresponding image-capturing mode is described. The position corresponding to the electronic viewfinder mode of the image-capturing mode switch 112 is arranged between the position corresponding to the optical viewfinder mode and the position corresponding to the moving-image capturing mode. When the user moves the knob 112B and stops the knob 112B at any one of the three predetermined positions, the image-capturing mode of the image capturing device 1 is switched.

Further, the position of the image-capturing mode switch 112 according to the present embodiment is not limited to the back side of the camera body 100. FIGS. 7A through 7C and 8A through 8C are external views of the image capturing apparatus 1 and the image-capturing mode switch 112 according to another variation of the present embodiment. In the present variation as well, the image-capturing mode switch 112 is disposed on a position that helps the user in recognizing and operating the image-capturing mode switch 112. More specifically, in the present variation, the image-capturing mode switch 112 is disposed on the top of the camera body 100. In the present variation, the image-capturing mode switch 112 is a rotatable columnar dial. On the top of the dial, symbols (for example, character strings) representing each image-capturing mode are described side by side in the direction of rotation. Further, on the top of the dial, the symbol representing the electronic viewfinder mode is described between the position of the symbol representing the optical viewfinder mode and the position of the symbol representing the moving-image capturing mode. An index 112C is provided on the top of the camera body 100. When the dial is rotated such that one of symbols on the top of the dial is adjacent to the indicator 112C, the image-capturing mode of the image capturing device 1 is switched to the image-capturing mode corresponding to the symbol.

Further, in the configuration illustrated in FIGS. 7A through 7C, the exposure mode dial 127 is disposed on the top of the camera body 100. With this exposure mode dial 127, automatic exposure (AE) functions such as a program AE, a shutter priority AE, and a aperture-stop priority AE are selected. In the configuration according to a variation as illustrated in FIGS. 7A through 7C, the image-capturing mode switch 112 and the exposure mode dial 127 are separately provided, but the present embodiment is not limited to this configuration.

FIGS. 9A through 9C and 10A through 10C are external views of the image capturing device 1 and the image-capturing mode switch 112 according to another variation of the present embodiment. In the present variation, the image-capturing mode switch 112 and the exposure mode dial 127 are disposed on the top of the camera body 100, so that the user can easily view and operate the image-capturing mode switch 112 and the exposure mode dial 127. The exposure mode dial 127 is used for setting the exposure mode. The image-capturing mode switch 112 has a ring shape surrounding the exposure mode dial 127. The exposure mode dial 127 and the image-capturing mode switch 112 have coaxial axes and are rotatable independently of each other. The image-capturing mode switch 112 has a lever 112D, and the lever 112D can be stopped at three predetermined positions corresponding to the image-capturing mode. In the area of the camera main body 100 adjacent to the predetermined position where the lever 112D can be stopped, a symbol (for example, a character string) indicating the corresponding image-capturing mode is described. When the user moves the lever 112D and stops it at any one of three predetermined positions, the image-capturing mode of the image-capturing device 1 is switched.

In the configuration shown in FIGS. 9A through 9C and 10A through 10C, the image-capturing mode switch 112 and the exposure mode dial 127 are coaxially arranged on the top of the camera body 100. With such a configuration, the user can readily view which mode each of the image-capturing mode and the exposure mode is set to, in other words, the combination of the image-capturing mode and the exposure mode, which allows quickly changing the combination of the image-capturing mode and the exposure mode.

In the configuration shown in FIGS. 9A through 9C and 10A through 10C, the image-capturing mode switch 112 and the exposure mode dial 127 are coaxially arranged on the top of the camera body 100 as described above. However, the present embodiment is not limited to this configuration. Specifically, in order to easily view both the image-capturing mode and the exposure mode, the image-capturing mode switch 112 may be arranged in the vicinity of the exposure mode dial 127. For example, by disposing the shooting mode switch 112 adjacent to the exposure mode dial 127 in the upper part of the camera body 100, the user can easily view and change both the image-capturing mode and the exposure mode.

The configuration of the present embodiment allows the image capturing device to be operable with the image-capturing status that corresponds to the stationary position of the status switch when the power switch switches the image capturing device 1 to the operable condition.

The above-described configuration of the present disclosure allows the user to know the image-capturing mode of the image capturing device 1 by looking at the stationary position of the mode switch. With a change in the position of the mode switch, the image-capturing mode of the image capturing device 1 can be changed to a desired mode. Thus, the user can perform an image capturing operation immediately after driving the image capturing device, without checking or switching the image-capturing mode.

According to at least one embodiment of the present disclosure, when the mode switch is set to any of three predetermined positions with the image capturing device 1 in the operable condition for example, the image-capturing mode of the image capturing device 1 is switched to the image-capturing mode corresponding to the stationary position of the mode switch.

According to at least one embodiment of the present disclosure, the predetermined position corresponding to the second mode of the mode switch is disposed between the predetermined position corresponding to the first mode and the predetermined position corresponding to the third mode.

According to at least one embodiment of the present disclosure, the image capturing device 1 includes, for example, an image sensor and an optical-path switch. The image sensor outputs an image signal of an image to display the image in the display. The optical-path switch is switchable between a first optical path to allow light rays emitted from an object to be directed toward the optical viewfinder and a second optical path to allow the light rays emitted from the object to be directed toward the image sensor. In this configuration, the optical-path switch switches between the first optical path and the second optical path when the image-capturing mode is switched between the first mode and the second mode. Further, in such a configuration, the optical-path switch maintains the second optical path when the image-capturing mode is switched between the second mode and the third mode.

According to at least one embodiment of the present disclosure, the image capturing device 1 includes, for example, a first display control and a second display control. The first display control is to control the display content on the screen of the display without displaying the image of the object on the display when the image-capturing mode is set to the first mode. The second display control is to control the display content of the display with the image of the object displayed on the display when the image-capturing mode is set to the second mode.

According to at least one embodiment of the present disclosure, the display includes an input receiver to receive an input into the image capturing device by detecting a touch with the display. In this configuration, the input receiver restricts the reception of the input into the image capturing device when the image capturing device is in the first mode. Further, the input receiver does not restrict the reception of the input into the image capturing device when the image capturing device is in the second mode or the third mode.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An image capturing device, comprising:
   a display;
   a mode switch to change a pointing position between three predetermined positions corresponding to three image-capturing modes including a first mode, a second mode, and a third mode, to switch between the first mode, the second mode, and the third mode, wherein the first mode is to capture a still image using an optical viewfinder, the second mode is to capture the still image while an object image is displayed on the display, and the third mode is to capture a moving image on the display;
   a power switch to receive a user input for turning on or off power of the image capturing device; and
   circuitry to control the image capturing device to operate in one of the three image-capturing modes,
   wherein, when the power switch receives a user input for turning on the power, the circuitry controls the image capturing device to operate in any one of the three image-capturing modes corresponding to the pointing position of the mode switch that has been set when the power switch is turned off.

2. The image capturing device according to claim 1, wherein, when the mode switch rotates and stops at any of the three predetermined positions with the power switch turned on, the circuitry changes the image-capturing mode to one of the image-capturing modes corresponding to the any of the three predetermined position at which the mode switch stops.

3. The image capturing device according to claim 1, wherein a predetermined position of the mode switch corresponding to the second mode is between a predetermined position corresponding to the first mode and a predetermined position corresponding to the third mode.

4. The image capturing device according to claim 1, further comprising:
   an image sensor to output an image signal of an object image of an object, the object image to be displayed on the display,
   wherein the circuitry switches between a first optical path to direct light rays emitted from the object toward the optical viewfinder and a second optical path to direct the light rays emitted from the object toward the image sensor,
   wherein, when the image-capturing mode is switched between the first mode and the second mode, the circuitry switches between the first optical path and the second optical path, and
   wherein, when the image-capturing mode is switched between the second mode and the third mode, the circuitry maintains the second optical path.

5. The image capturing device according to claim 1, further comprising:
   the display to display a display content,
   wherein the circuitry controls the display content of the display without displaying an object image when the image-capturing mode is the first mode, and
   controls the display content of the display with the object image displayed when the image-capturing mode is one of the second mode and the third mode.

6. The image capturing device according to claim 1, wherein the display includes
   an input receiver to detect a touch with a display surface of the display to receive a user input, wherein, when the image-capturing mode is the first mode, the input receiver of the display restricts the reception of the user input, and wherein, when the image-capturing mode is one of the second mode and the third mode, the input receiver of the display accepts the reception of the user input.

7. The image capturing device of claim 1, wherein the mode switch is switchable only between the three predetermined positions corresponding to the three image-capturing modes.

8. The image capturing device of claim 1, wherein each of the predetermined positions corresponds to only one of the three image-capturing modes.

* * * * *